(12) United States Patent
Omura et al.

(10) Patent No.: US 8,978,611 B2  
(45) Date of Patent: Mar. 17, 2015

(54) PISTON FOR INTERNAL COMBUSTION

(75) Inventors: Tetsuo Omura, Susono (JP); Akio Yoshimatsu, Gotenba (JP); Yasushi Yoshihara, Mishima (JP); Masafumi Takeda, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/578,968

(22) PCT Filed: Feb. 15, 2010

(86) PCT No.: PCT/JP2010/052159  
§ 371 (c)(1),  
(2), (4) Date: Aug. 14, 2012

(87) PCT Pub. No.: WO2011/099156  
PCT Pub. Date: Aug. 18, 2011

(65) Prior Publication Data  
US 2012/0318230 A1  Dec. 20, 2012

(51) Int. Cl.
| | |
|---|---|
| *F02B 23/00* | (2006.01) |
| *F02B 53/00* | (2006.01) |
| *F02F 3/08* | (2006.01) |
| *F02F 3/14* | (2006.01) |
| *F02B 23/10* | (2006.01) |

(52) U.S. Cl.  
CPC ... *F02F 3/08* (2013.01); *F02F 3/14* (2013.01); *F02B 23/104* (2013.01); *F02B 2023/106* (2013.01); *Y02T 10/125* (2013.01)  
USPC .................. 123/193.6; 123/193.1; 123/197.2; 123/307

(58) Field of Classification Search  
CPC ...... F02B 77/02; F02F 3/10–3/12; F02F 3/02; F02F 3/14; F02F 3/0076; F02F 3/24; F02F 3/26; F02F 3/28–3/285; F16J 1/01; Y02T 10/12; Y02T 10/125  
USPC .......................... 123/197.2, 193.6, 193.1, 307  
See application file for complete search history.

(56) References Cited

U.S. PATENT DOCUMENTS

| | | | |
|---|---|---|---|
| 3,251,349 A * | 5/1966 | Isley ........................... | 123/193.6 |
| 4,213,438 A * | 7/1980 | Elsbett et al. ................ | 123/668 |
| 4,658,706 A * | 4/1987 | Sander et al. .................. | 92/213 |
| 6,170,454 B1 * | 1/2001 | McFarland et al. ........ | 123/193.6 |

FOREIGN PATENT DOCUMENTS

| | | |
|---|---|---|
| CN | 2620764 Y | 6/2004 |
| JP | 56-138116 U | 10/1981 |
| JP | 56-175548 U | 12/1981 |

(Continued)

*Primary Examiner* — Lindsay Low  
*Assistant Examiner* — Kevin Lathers  
(74) *Attorney, Agent, or Firm* — Sughrue Mion, PLLC

(57) ABSTRACT

Disclosed is a piston (16) that is capable of not only suppressing the occurrence of knocking but also reducing cooling loss in an internal combustion engine in which a tumble flow is formed in a cylinder. The piston for the internal combustion engine in which the tumble flow is formed in the cylinder includes a non-adiabatic region (50) that is a region on a piston upper surface (35) brought into contact with the tumble flow during an intake stroke and has no insulating layer. The piston also includes an adiabatic region (52) that is a region on at least a part of the piston upper surface excluding the non-adiabatic region and has an insulating layer.

2 Claims, 3 Drawing Sheets

(56) References Cited

FOREIGN PATENT DOCUMENTS

| | | | |
|---|---|---|---|
| JP | 60-178345 U | 11/1985 | |
| JP | 2-118152 U | 9/1990 | |
| JP | 2699586 B2 | 1/1998 | |
| JP | 2000073770 A * | 3/2000 | .............. F02B 23/00 |
| JP | 3758357 B2 | 3/2006 | |
| JP | 2008-111367 A | 5/2008 | |
| JP | 2009-036126 A | 2/2009 | |
| JP | 2009-041388 A | 2/2009 | |
| JP | 2009-062975 A | 3/2009 | |
| JP | 2009-121425 A | 6/2009 | |
| WO | WO 2007/080746 * | 7/2007 | .............. F02B 23/06 |

* cited by examiner

PISTON FOR INTERNAL COMBUSTION

CROSS REFERENCE TO RELATED APPLICATIONS

This application is a National Stage of International Application No. PCT/JP2010/052159 filed Feb. 15, 2012, the contents of all of which are incorporated herein by reference in their entirety.

TECHNICAL FIELD

The present invention relates to a piston for an internal combustion engine.

BACKGROUND ART

A conventionally known piston for an internal combustion engine, which is disclosed, for instance, in Patent Document 1, is provided with a non-adiabatic region and an adiabatic region. The non-adiabatic region is positioned laterally relative to an intake flow and disposed on the upper surface of the piston. The adiabatic region is a region other than the non-adiabatic region. The presence of the adiabatic region makes it possible to reduce cooling loss.

PRIOR ART DOCUMENTS

Patent Documents

Patent Document 1: JP-A-2008-111367
Patent Document 2: JP-A-2009-121425
Patent Document 3: JP-A-2009-036126
Patent Document 4: JP-A-2009-041388
Patent Document 5: JP-A-2009-062975

SUMMARY OF INVENTION

Technical Problem

In an internal combustion engine in which a tumble flow is formed in a cylinder, a strong intake flow (the flow of intake gas) comes into contact with the upper surface of the piston during an intake stroke. A region contacted by the strong intake flow increases its thermal conductivity. Therefore, the intake gas is heated by the upper surface of the piston. In the case of the aforementioned conventional piston, the adiabatic region is disposed in the region contacted by the strong intake flow. Hence, the temperature of the adiabatic region is high although the cooling loss is small. Consequently, the thermal dose applied to the intake gas by the upper surface of the piston is increased. An increase in the thermal dose applied to the intake gas raises the temperature of the intake gas at a compression end. As a result, it is anticipated that knocking may occur.

The present invention has been made to solve the above problem. An object of the present invention is to provide a piston that is used for an internal combustion engine having a cylinder in which a tumble flow is formed and capable of suppressing the occurrence of knocking and reducing the cooling loss.

Solution to Problem

A first aspect of the present invention is a piston for an internal combustion engine in which a tumble flow is formed in a cylinder, the piston comprising:

a non-adiabatic region that is a region on a piston upper surface brought into contact with the tumble flow during an intake stroke, the non-adiabatic region having no insulating layer; and an adiabatic region that is a region on at least a part of the piston upper surface excluding the non-adiabatic region, the adiabatic region having an insulating layer.

A second aspect of the present invention is a piston for an internal combustion engine, comprising:

a non-adiabatic region that includes a central portion of a piston upper surface, the non-adiabatic region being shaped like a strip extended from the intake side to the exhaust side of the piston upper surface, the non-adiabatic region having no insulating layer; and an adiabatic region that is disposed on part of the piston upper surface that is positioned laterally relative to the non-adiabatic region, the adiabatic region having an insulating layer.

A third aspect of the present invention is a piston for an internal combustion engine in which a tumble flow is formed in a cylinder, the piston comprising:

a non-adiabatic region that is disposed on a piston upper surface, the non-adiabatic region including at least a tumble flow contact region with which the tumble flow is in contact during an intake stroke, the non-adiabatic region having no insulating layer; and a heat-insulating member that is disposed inside of the piston but adjacent the circumference of the tumble flow contact region.

A fourth aspect of the present invention is a piston for an internal combustion engine, comprising:

a non-adiabatic region that is disposed on a piston upper surface including at least a central portion of the piston upper surface, the non-adiabatic region having no insulating layer; and a heat-insulating member that is disposed inside of the piston above a piston pin boss, the heat-insulating member extending perpendicularly to the axial direction of the piston pin boss but parallel to the piston upper surface.

Advantageous Effects of Invention

When the tumble flow is formed in the cylinder, the first and second aspects of the present invention make it possible to ensure that a region on the upper surface of the piston except for a region with which the tumble flow is in contact is an adiabatic region. The presence of the adiabatic region decreases the amount of heat transferred from a combustion gas to the piston and reduces the cooling loss. Further, the first and second aspects of the present invention form a non-adiabatic region on the upper surface of the piston with which the tumble flow is in contact. The temperature of the upper surface of the piston is lower in the non-adiabatic region than in the adiabatic region. Although the thermal conductivity is high in a region with which the tumble flow is in contact, the temperature of the region is decreased when it is a non-adiabatic region. Hence, the thermal dose applied to the intake gas by the upper surface of the piston is decreased. This lowers the temperature of the intake gas at the compression end and suppresses the occurrence of knocking. Consequently, when applied to an internal combustion engine in which an in-cylinder tumble flow is formed, the present invention not only suppresses the occurrence of knocking but also reduces the cooling loss.

When the tumble flow is formed in the cylinder, the third and fourth aspects of the present invention make it possible to ensure that the temperature of a region with which the tumble flow is in contact is kept low. More specifically, as a region on the upper surface of the piston with which the tumble flow is in contact has a high thermal conductivity, heat is transferred from the piston to the intake gas to lower the temperature of the region. In this instance, heat is transferred from the other region of the piston, which has a high temperature, to the aforementioned region where the temperature is lowered. This heat transfer is performed in order to maintain a thermal equilibrium. However, the present invention is configured so that the heat transfer is obstructed by a heat-insulating member disposed in the piston. Therefore, the temperature of the region contacted by the tumble flow can be kept low to decrease the thermal dose applied to the intake gas by the upper surface of the piston. Consequently, the present invention can lower the temperature of the intake gas at the compression end and suppress the occurrence of knocking.

Figure 1:
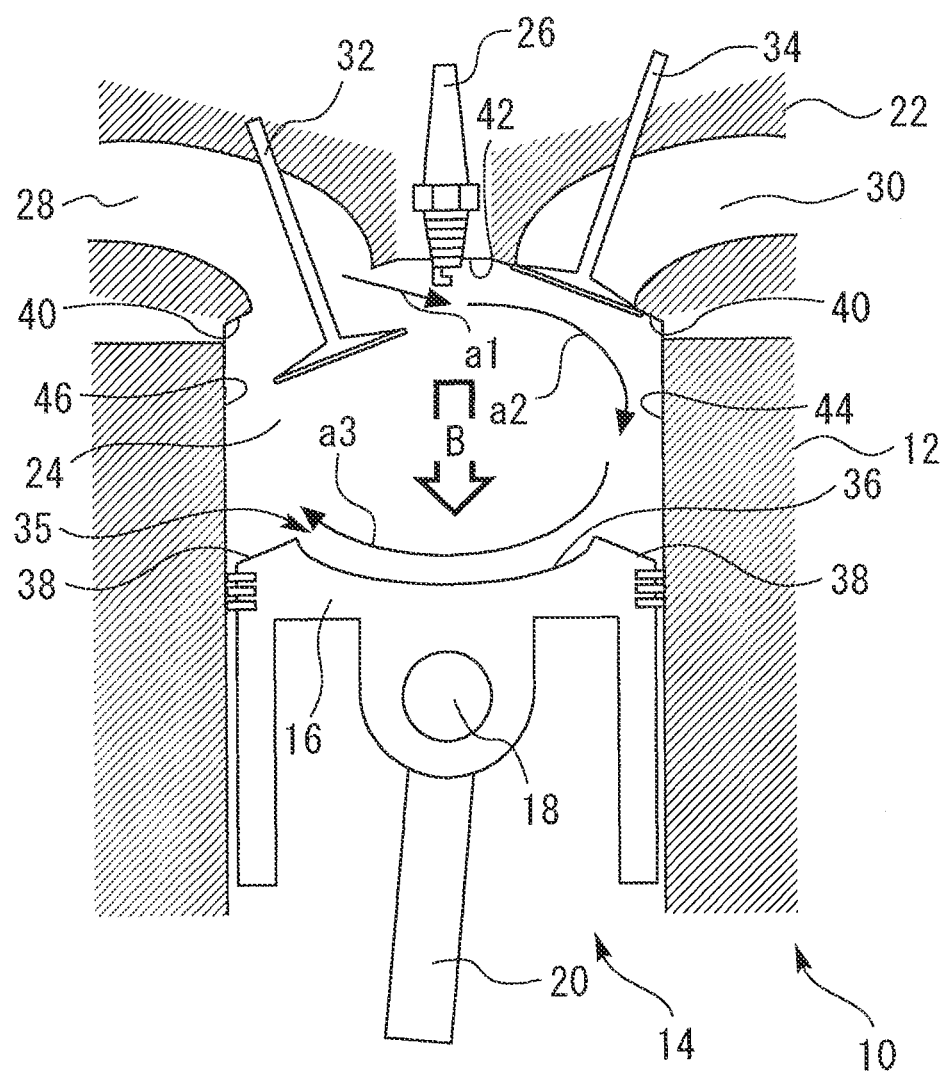
FIG. 1 is a diagram illustrating the system configuration of an internal combustion engine according to a first embodiment of the present invention.

REFERENCE SIGNS LIST 10 internal combustion engine
12 cylinder block
14 cylinder
16, 60 piston
18 piston pin
20 connecting rod
22 cylinder head
24 combustion chamber
26 ignition plug
28 intake port
30 exhaust port
32 intake valve
34 exhaust valve
35, 62 upper surface
36 central portion
38, 66 an outer rim of the upper surface of the piston
40 an outer rim of the concaved underside of the cylinder head
42 upper surface of the combustion chamber
44 exhaust sidewall of the cylinder
46 intake sidewall of the cylinder
$48_{EX}$, $48_{IN}$, $64_{IN}$, $64_{EX}$ valve recesses
50, 70 a tumble flow contact region
52 a region other than the tumble flow contact region
68 piston pin boss
72 heat insulator

DESCRIPTION OF EMBODIMENTS

Embodiments of the present invention will now be described in detail with reference to the accompanying drawings. Like elements in the drawings are designated by the same reference numerals and will not be redundantly described.

First Embodiment

Basic Configuration

FIG. 1 is a diagram illustrating the system configuration of an internal combustion engine 10 according to a first embodiment of the present invention. A system according to the first embodiment includes the internal combustion engine 10. It is assumed that the internal combustion engine 10 is a four-cycle engine. FIG. 1 is a longitudinal cross-sectional view of the internal combustion engine 10.

The internal combustion engine 10 includes a cylinder block 12. A cylinder 14 is formed in the cylinder block 12. In the present invention, the number of cylinders included in the internal combustion engine 10 is not specifically limited. A piston 16 is slidably disposed in the cylinder 14. The piston 16 is coupled to a crankshaft through a piston pin 18 and a connecting rod 20.

A cylinder head 22 is mounted on top of the cylinder block 12. A combustion chamber 24 for the internal combustion engine 10 is a space that is enclosed by the inner surface of the cylinder 14 formed in the cylinder block 12, the upper surface of the piston 16, and the concaved underside of the cylinder head 22. An ignition plug 26 is mounted on the cylinder head 22 in such a manner that the ignition plug 26 protrudes into the combustion chamber 24 from the top of the combustion chamber 24.

An intake port 28 and an exhaust port 30 are formed on the cylinder head 22 to communicate with the combustion chamber 24. An injector (not shown) is disposed upstream of the intake port 28 and oriented toward the combustion chamber 24 to inject fuel into the intake port 28. The system according to the present embodiment includes an ECU (electronic control unit), which is not shown in the figure. The ECU is connected to the aforementioned ignition plug 26 and to the injector. The ECU causes the injector to inject the fuel during an intake stroke and allows the ignition plug 26 to function as a spark igniter during a compression stroke.

The downstream portion of the intake port 28 is divided into two branches. An intake valve 32 is provided for each of the branched downstream ends of the intake port 28 to open and close the intake port 28 relative to the combustion chamber 24. Similarly, the upstream portion of the exhaust port 30 is divided into two branches. An exhaust valve 34 is provided for each of the branched upstream ends of the exhaust port 30 to open and close the exhaust port 30 relative to the combustion chamber 24. In the present invention, the number of branches of the intake port and of the exhaust port, the number of intake valves, and the number of exhaust valves are not specifically limited.

A spherical concave is formed at the central portion 36 of the upper surface 35 of the piston 16 that faces the combustion chamber. Further, a slanted squish is formed on an outer rim 38 of the upper surface 35 of the piston 16. The slanted squish is oriented from the outer rim to the central portion 36 and tilted upward toward the combustion chamber. Another slanted squish is formed on an outer rim 40 of the concaved underside of the cylinder head 22, which forms the combustion chamber 24, and is positioned opposite the outer rim 38. In other words, a squish area is formed between the outer rims 38, 40.

Figure 2:
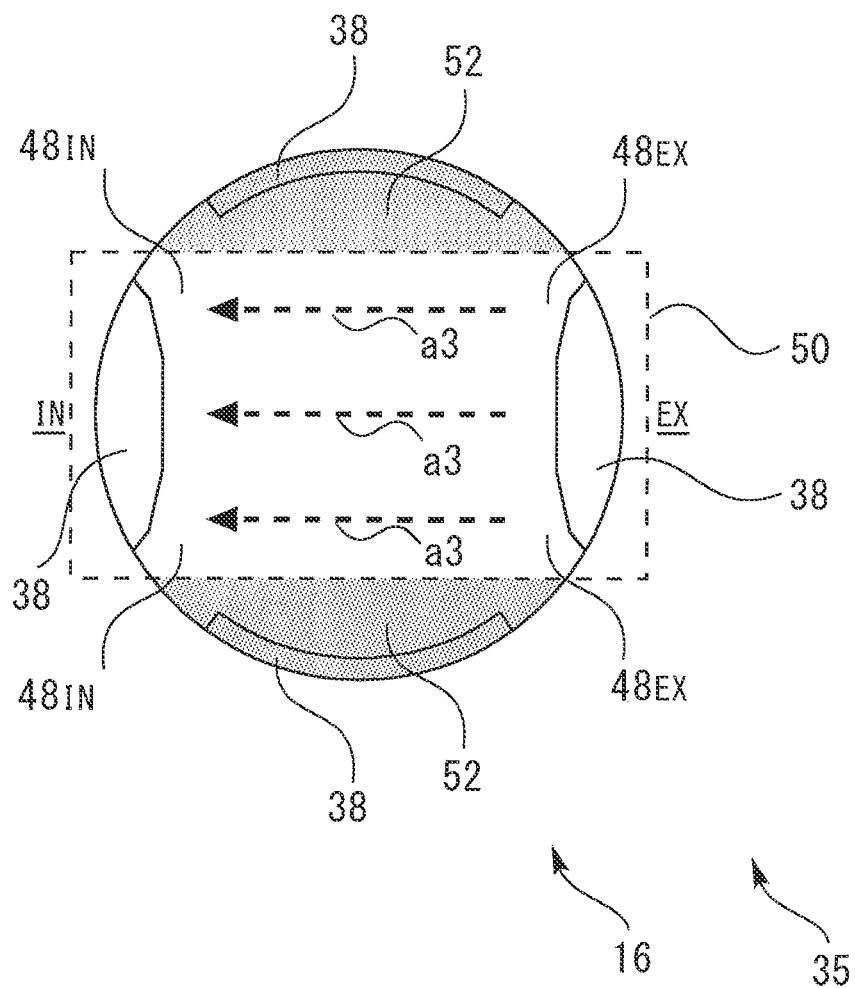
FIG. 2 is a diagram illustrating the structure of the upper surface 35 of the piston 16 according to the first embodiment of the present invention.

FIG. 2 is a diagram illustrating the structure of the upper surface 35 of the piston 16 according to the first embodiment of the present invention. FIG. 2 is a top view of the upper surface 35 of the piston 16 taken in the direction of arrow B in FIG. 1. As shown in FIG. 2, valve recesses $48_{IN}$, which respectively correspond to an umbrella-shaped portion of either one of two intake valves 32, are formed on the upper surface 35 of the piston 16. Similarly, valve recesses 48$_{EX}$, which respectively correspond to an umbrella-shaped portion of either one of two exhaust valves 34, are formed on the upper surface 35. Further, four outer rims 38, which form the aforementioned squish area, are formed on the upper surface 35 and positioned so as to sandwich the valve recesses 48$_{IN}$, 48$_{EX}$.

(Distinctive Configuration)

An intake flow in the system according to the present embodiment, which is the flow of an intake gas (air-fuel mixture) obtained by mixing fuel with fresh air, will now be described. FIG. 1 shows a typical intake flow that is formed in the cylinder 14 during the intake stroke of the system according to the present embodiment. Solid-line arrow a1 represents the flow of the intake gas that is taken in through the intake port 28 during the intake stroke and introduced to the upper surface 42 of the combustion chamber 24 along the rear surface of the umbrella-shaped portion of the intake valve 32 facing the intake port 28. Solid-line arrow a2 represents the flow of the intake gas that is introduced during the intake stroke from the upper surface 42 of the combustion chamber 24 to an exhaust sidewall 44 of the cylinder 14 along the front surface of the umbrella-shaped portion of the exhaust valve 34 facing the combustion chamber 24. Solid-line arrow a3 represents the flow of the intake gas that is brought into contact with the exhaust sidewall 44 of the cylinder 14 and with the upper surface 35 during the intake stroke and introduced to an intake sidewall 46 of the cylinder 14. As described above, a tumble flow represented by solid-line arrows a1 to a3 is formed in the system according to the present embodiment. Solid-line arrow a3 is oriented perpendicularly to the axis line of the piston pin 18.

Broken-line arrows a3 in FIG. 2 represent the flow of the intake gas that comes into contact with the upper surface 35 during the intake stroke, as is the case with solid-line arrow a3 in FIG. 1. A region 50 on the upper surface 35 shown in FIG. 2 is a region where the intake gas flows in contact with the upper surface 35 as a tumble flow. The region 50 is hereinafter referred to as the tumble flow contact region.

It is conceivable that the definition of the tumble flow contact region 50 on the upper surface 35 of the piston 16 may vary, for instance, with the specifications for the internal combustion engine to which the present invention is applied, such as the shapes of the intake port 28 and of the upper surface 35 and the position and the valve opening characteristic of the intake valve 32. In general, therefore, the tumble flow contact region 50 is defined on an experimental basis for each internal combustion engine. For example, a region of the upper surface 35 with which the tumble flow exhibiting a thermal conductivity not lower than a threshold value comes into contact can be defined by experiment or the like as the tumble flow contact region 50 contacted by a strong air flow. In this instance, it is assumed that the upper surface 35 excluding the tumble flow contact region 50 is contacted by a weak air flow exhibiting a thermal conductivity not higher than the threshold value and is not contacted by the tumble flow.

As described above, the tumble flow is formed during the intake stroke when the configuration according to the present embodiment is employed. The intake flow, which is the tumble flow, flows from the exhaust side of the cylinder 14 to the upper surface 35 of the piston 16 and passes toward the intake side of the cylinder 14 while in contact with the upper surface 35. Hence, a strong air flow comes into contact with the tumble flow contact region 50 of the upper surface 35.

In the system according to the present embodiment, at least a part of the upper surface 35 excluding the tumble flow contact region 50 is configured as an adiabatic region where an insulating layer is formed. For example, a region 52 other than the tumble flow contact region 50 is configured as the adiabatic region where the insulating layer is formed. Referring to FIG. 2, the region 52 (adiabatic region) is disposed laterally relative to the tumble flow that is extended from the exhaust side to the intake side while in contact with the piston upper surface. A ceramic or other heat-insulating member is used as a heat insulator that forms the insulating layer.

Moreover, in the system according to the present embodiment, the tumble flow contact region 50 which is contacted by a strong air is configured as a non-adiabatic region where no insulating layer is formed. As mentioned earlier, the tumble flow contact region 50 is experimentally defined for each internal combustion engine. Therefore, a typical example is described below. It is defined that the long sides of the tumble flow contact region 50 are extended from a position in contact with the exhaust sidewall 44 to a position in contact with the intake sidewall 46 to pass through the central portion 36 of the upper surface 35. The short sides of the tumble flow contact region 50 are defined as described below. First of all, the intake valve 32 and the exhaust valve 34, which oppose each other, are handled as a pair. In the system according to the present embodiment, two pairs of the intake valve 32 and the exhaust valve 34 are arranged in parallel. Next, the umbrella-shaped portions of each pair of the intake and exhaust valves are projected onto the upper surface 35. A line segment is then drawn to connect the centers of the projected umbrella-shaped portions of the intake and exhaust valves. Parallel line segments are drawn for the two pairs. The distance between the parallel line segments is defined as the short sides of the tumble flow contact region 50. The tumble flow contact region 50 is defined as a strip-shaped range on the upper surface 35 that is enclosed by the above parallel line segments.

As described above, when the region 52, which is not contacted by a strong air flow during the intake stroke, is configured as the adiabatic region, the configuration according to the present embodiment, which is shown in FIGS. 1 and 2, makes it possible to decrease the amount of heat transferred from a combustion gas to the piston 16 and reduce cooling loss.

Further, when the tumble flow contact region 50, which is contacted by a strong tumble flow during the intake stroke and has a high thermal conductivity, is configured as the non-adiabatic region, the configuration according to the present embodiment ensures that the temperature of the tumble flow contact region 50 is lower than when the insulating layer is formed. When the temperature of the tumble flow contact region 50 is lowered, the thermal dose applied to the intake gas by the upper surface of the piston can be decreased. This makes it possible to lower the temperature of the intake gas at a compression end and suppress the occurrence of knocking.

As described above, in an internal combustion engine in which a tumble flow is formed in a cylinder, the system according to the present embodiment makes it possible to not only suppress the occurrence of knocking, but also reduce the cooling loss. Consequently, preferred thermal efficiency can be achieved.

In the system according to the first embodiment, which has been described above, the short sides of the tumble flow contact region 50 are defined as the distance between the parallel line segments for the two pairs of the intake and exhaust valves in a situation where the line segments are drawn to connect the centers of the projected umbrella-shaped portions of the intake and exhaust valves. However, the present invention is not limited to such a method of defining the short sides of the tumble flow contact region 50. A first alternative is to draw parallel tangent lines that are counted as common tangent lines for the projected umbrella-shaped portions of two pairs of the intake and exhaust valves and positioned toward the center of the piston, and define the short sides of the tumble flow contact region 50 as the distance between the parallel tangent lines drawn for the two pairs of the intake and exhaust valves. A second alternative is to draw parallel tangent lines that are counted as common tangent lines for the projected umbrella-shaped portions of two pairs of the intake and exhaust valves and positioned toward the outer rims of the piston, and define the short sides of the tumble flow contact region 50 as the distance between the parallel tangent lines drawn for the two pairs of the intake and exhaust valves. This also holds true for the subsequent embodiment.

Further, in the system according to the first embodiment, which has been described above, it is assumed that a port-injection injector is employed as the injector. Alternatively, however, an in-cylinder direct-injection injector may be employed. This also holds true for the subsequent embodiment.

In the first embodiment, which has been described above, the piston 16 corresponds to the "piston" according to the first and second aspects of the present invention; the upper surface 35 corresponds to the "piston upper surface" according to the first and second aspects of the present invention; the tumble flow contact region 50 corresponds to the "non-adiabatic region" according to the first and second aspects of the present invention; and the region 52 corresponds to the "adiabatic region" according to the first and second aspects of the present invention.

Second Embodiment

Basic Configuration

A second embodiment of the present invention will now be described with reference to FIGS. 3(A) and 3(B). The system according to the second embodiment has substantially the same configuration as the system according to the first embodiment except that a later-described piston 60 is used in place of the piston 16 shown in FIG. 1.

Figure 3A:
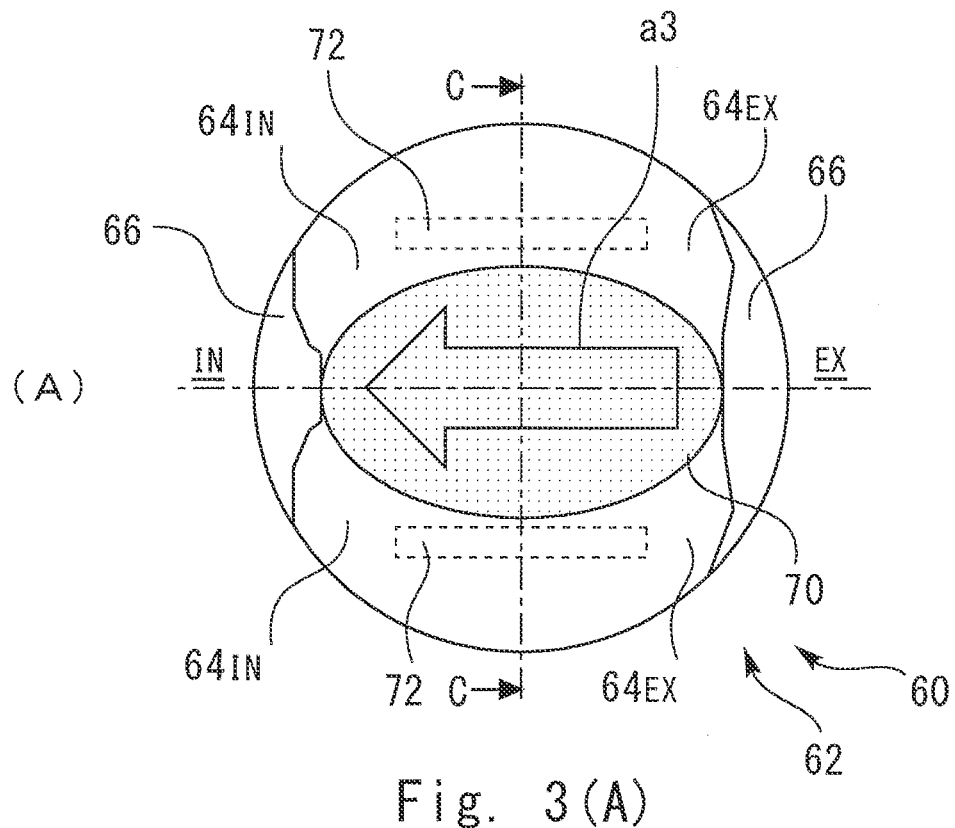
FIG. 3(A) is a top view illustrating the structure of the upper surface 62 of the piston 60 in the system according to a second embodiment of the present invention.

FIG. 3(A) is a top view illustrating the structure of the upper surface 62 of the piston 60 in the system according to the second embodiment. As shown in FIG. 3(A), valve recesses $64_{IN}$, which respectively correspond to an umbrella-shaped portion of either one of two intake valves 32, are formed on the upper surface 62 of the piston 60. Similarly, valve recesses $64_{EX}$, which respectively correspond to an umbrella-shaped portion of either one of two exhaust valves 34, are formed on the upper surface 62. Further, two outer rims 66, which form a squish area, are formed on the upper surface 35 and positioned so as to sandwich the valve recesses $64_{IN}$, $64_{EX}$.

Figure 3B:
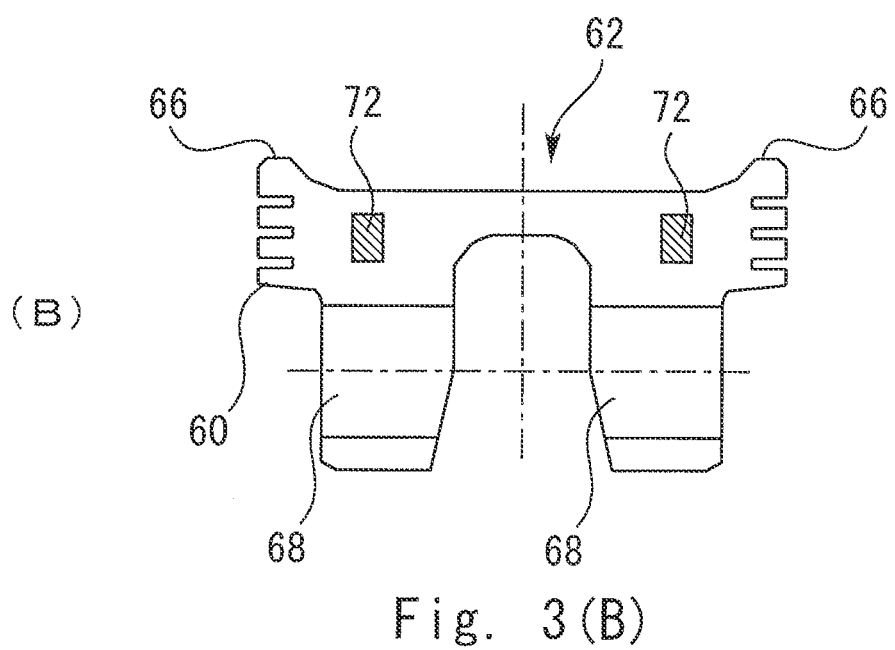
FIG. 3(B) is a longitudinal cross-sectional view of the piston 60 according to the second embodiment of the present application.

FIG. 3(B) is a longitudinal cross-sectional view of the piston 60 taken along line C-C of FIG. 3(A). A piston pin boss 68 is disposed at the bottom of the piston 60. The piston pin boss 68 is disposed on each of lateral portions that are positioned perpendicularly to the intake/exhaust direction of the upper surface 62. The piston pin 18 shown in FIG. 1 is inserted into the piston pin boss 68.

(Distinctive Configuration)

The intake flow in the system according to the present embodiment, which is the flow of the intake gas (air-fuel mixture) obtained by mixing fuel with fresh air, will now be described. In the system according to the present embodiment, the tumble flow represented by solid-line arrows a1 to a3 is formed, as is the case with the earlier-described system shown in FIG. 1.

Arrow a3 shown in FIG. 3(A) represents the flow of the intake gas that is in contact with the upper surface 62 during the intake stroke, as is the case with solid-line arrow a3 in FIG. 1. A region 70 on the upper surface 62, which is shown in FIG. 3(A), is a region where the intake gas flows in contact with the upper surface 62 as a tumble flow. The region 70 is hereinafter referred to as the tumble flow contact region.

It is conceivable that the definition of the tumble flow contact region 70 on the upper surface 62 of the piston 60 may vary, for instance, with the specifications for the internal combustion engine to which the present invention is applied, as is the case with the definition of the tumble flow contact region 50 in the first embodiment described earlier. In general, therefore, the tumble flow contact region 70 is defined on an experimental basis for each internal combustion engine. The method of defining the tumble flow contact region 70 will not be described here because it is the same as described in connection with the earlier-described tumble flow contact region 50. As an example, FIG. 3(A) shows an elliptical tumble flow contact region 70 that includes the central portion of the piston 60 and is elongated in the direction of intake flow.

As described above, the tumble flow is formed during the intake stroke when the configuration according to the present embodiment is employed. The intake flow, which is the tumble flow, flows from the exhaust side of the cylinder 14 to the upper surface 62 of the piston 60 and passes toward the intake side of the cylinder 14 while in contact with the upper surface 62. Hence, a strong air flow comes into contact with the tumble flow contact region 70 of the upper surface 62.

In the system according to the present embodiment, at least the tumble flow contact region 70, which is contacted by the strong air flow, is configured as a non-adiabatic region where no insulating layer is formed. In FIG. 3(A), a region other than the tumble flow contact region 70 on the upper surface 62 is also configured as the non-adiabatic region.

Further, in the system according to the present embodiment, a heat insulator 72 is embedded into the piston 60 and placed at a shallow position beneath the upper surface 62, as shown in FIG. 3(B). As viewed from above the piston, the heat insulator 72 is disposed at a boundary between the tumble flow contact region 70 and the other region. In a typical example, the heat insulator 72 is placed at two positions and oriented parallel to the direction of intake flow as shown in FIG. 3(B). The heat insulator 72 is, for example, is shaped like a rectangular parallelepiped. However, the shape of the heat insulator 72 is not limited to a rectangular parallelepiped. A ceramic or other heat-insulating member is used as the heat insulator 72.

In other words, the heat insulator 72 shown in FIG. 3(B) is placed inside the piston 60, which is positioned above the piston pin boss 68, and oriented perpendicularly to the axial direction of the piston pin boss 68 (the axial direction of the piston pin 18) and parallel to the upper surface 62.

In the above-described configuration according to the present embodiment, the tumble flow contact region 70, which is in contact with a strong tumble flow during the intake stroke, has a high heat transfer coefficient. Due to a high thermal conductivity, heat is transferred from the piston 60 to the intake gas. This lowers the temperature of the tumble flow contact region 70. As a region other than the tumble flow contact region 70 has a high temperature in this instance, heat is transferred to the tumble flow contact region 70 where the temperature is lowered. This heat transfer is performed in order to maintain a thermal equilibrium.

However, the heat insulator 72 inserted into the piston 60 according to the present embodiment blocks the transfer of heat. As the heat transfer is blocked, the temperature of the tumble flow contact region 70, which is contacted by a strong tumble flow, can be kept low to decrease the thermal dose applied to the intake gas. This makes it possible to lower the temperature of the intake gas at the compression end and suppress the occurrence of knocking. According to the present invention, therefore, the occurrence of knocking can be suppressed in an internal combustion engine in which a tumble flow is formed in a cylinder.

In the system according to the second embodiment, which has been described above, the heat insulator 72 is placed at two positions and oriented parallel to the direction of intake flow in the piston 60. However, the present invention is not limited to such arrangement of the heat insulator 72. For example, the heat insulator 72 may be positioned to surround the entire outer circumference or a part of the tumble flow contact region 70.

Further, in the system according to the second embodiment, which has been described above, the upper surface 62 is entirely configured as the non-adiabatic region. However, a region other than the tumble flow contact region 70 may be configured as the adiabatic region where the insulating layer is formed.

In the second embodiment, which has been described above, the piston 60 corresponds to the "piston" according to the third and fourth aspects of the present invention; the upper surface 62 corresponds to the "piston upper surface" according to the third and fourth aspects of the present invention; the heat insulator 72 corresponds to the "heat-insulating member" according to the third and fourth aspects of the present invention; the tumble flow contact region 70 corresponds to the "tumble flow contact region" according to the third aspect of the present invention; a region on the upper surface 62 including the tumble flow contact region 70 corresponds to the "non-adiabatic region" according to the third and fourth aspects of the present invention; and the piston pin boss 68 corresponds to the "piston pin boss" according to the fourth aspect of the present invention.

The invention claimed is:

1. A piston for an internal combustion engine, comprising:
a non-adiabatic region that includes a central portion of a piston upper surface, wherein the piston upper surface has an edge which is in contact with the piston wall, the non-adiabatic region being shaped like a strip extended from the edge on an intake side of the piston upper surface to the edge on an opposite exhaust side of the piston upper surface, the non-adiabatic region having no insulating layer; and
    an adiabatic region that is disposed on part of the piston upper surface that is positioned laterally relative to the non-adiabatic region, the adiabatic region having an insulating layer,
    wherein both an intake side end and an exhaust side end of the non-adiabatic region join together with a piston wall of the piston.

2. A piston for an internal combustion engine, comprising:
a non-adiabatic region that includes a central portion of a piston upper surface, the non-adiabatic region being shaped like a strip extended from an intake side to an exhaust side of the piston upper surface, the non-adiabatic region having no insulating layer;
an adiabatic region that is disposed on part of the piston upper surface that is positioned laterally relative to the non-adiabatic region, the adiabatic region having an insulating layer; and
two pairs of an intake valve and an exhaust valve arranged in parallel;
wherein a short side length of the non-adiabatic region is a distance between a line segment that connects centers of umbrella-shaped portions of the intake and exhaust valves of a first pair of the two pairs and a line segment that connects centers of umbrella-shaped portions of the intake and exhaust valves of a second pair of the two pairs.

* * * * *